(12) United States Patent
Keely et al.

(10) Patent No.: US 12,315,069 B2
(45) Date of Patent: May 27, 2025

(54) TECHNIQUE FOR TESTING RAY FOR INTERSECTION WITH ORIENTED BOUNDING BOXES

(71) Applicant: Advanced Micro Devices, Inc., Santa Clara, CA (US)

(72) Inventors: Sean Keely, Austin, TX (US); Daniel James Skinner, Milton Keynes (GB)

(73) Assignee: Advanced Micro Devices, Inc., Santa Clara, CA (US)

( * ) Notice: Subject to any disclaimer, the term of this patent is extended or adjusted under 35 U.S.C. 154(b) by 221 days.

(21) Appl. No.: 18/090,689

(22) Filed: Dec. 29, 2022

(65) Prior Publication Data
US 2024/0221284 A1    Jul. 4, 2024

(51) Int. Cl.
*G06T 15/06* (2011.01)

(52) U.S. Cl.
CPC .......... *G06T 15/06* (2013.01); *G06T 2210/12* (2013.01)

(58) Field of Classification Search
CPC . G06T 15/06; G06T 2210/12; G06T 2210/21; G06T 17/005; G06T 15/08; G06T 1/20; G06T 15/005; G06T 17/10; G06F 9/3888; G06F 12/0811; G06V 40/171; G06V 40/161
See application file for complete search history.

(56) References Cited

U.S. PATENT DOCUMENTS

| | | | | |
|---|---|---|---|---|
| 10,970,914 | B1 * | 4/2021 | Clark | G06T 15/06 |
| 2014/0146049 | A1 * | 5/2014 | Ozdas | G06T 15/06 345/426 |
| 2022/0375153 | A1 * | 11/2022 | Fenney | G06T 15/005 |

OTHER PUBLICATIONS

Vaidyanathan, K., et. al., "Watertight Ray Traversal with Reduced Precision", High Performance Graphics (2016); The Eurographics Association 2016, 8 pgs.
Gottschalk, S., "Collision Queiries using Oriented Bounding Boxes"; Dissertation submitted to the faculty of The University of North Carolina at Chapel Hill, Chapel Hill, 2000, 192 pgs.

* cited by examiner

*Primary Examiner* — Xilin Guo
(74) *Attorney, Agent, or Firm* — Volpe Koenig

(57) ABSTRACT

A technique for performing ray tracing operations is provided. The technique includes determining error bounds for a rotation operation for a ray; selecting a technique for determining whether the ray intersects a bounding box based on the error bounds; and determining whether the ray hits the bounding box based on the selected technique.

20 Claims, 8 Drawing Sheets

TECHNIQUE FOR TESTING RAY FOR INTERSECTION WITH ORIENTED BOUNDING BOXES

BACKGROUND

In image synthesis, ray tracing is utilized to find a nearest intersection of a given ray with a scene where light propagation is simulated.

BRIEF DESCRIPTION OF THE DRAWINGS

A more detailed understanding can be had from the following description, given by way of example in conjunction with the accompanying drawings wherein.

DETAILED DESCRIPTION

A technique for performing ray tracing operations is provided. The technique includes determining error bounds for a rotation operation for a ray; selecting a technique for determining whether the ray intersects a bounding box based on the error bounds; and determining whether the ray hits the bounding box based on the selected technique.

Figure 1:
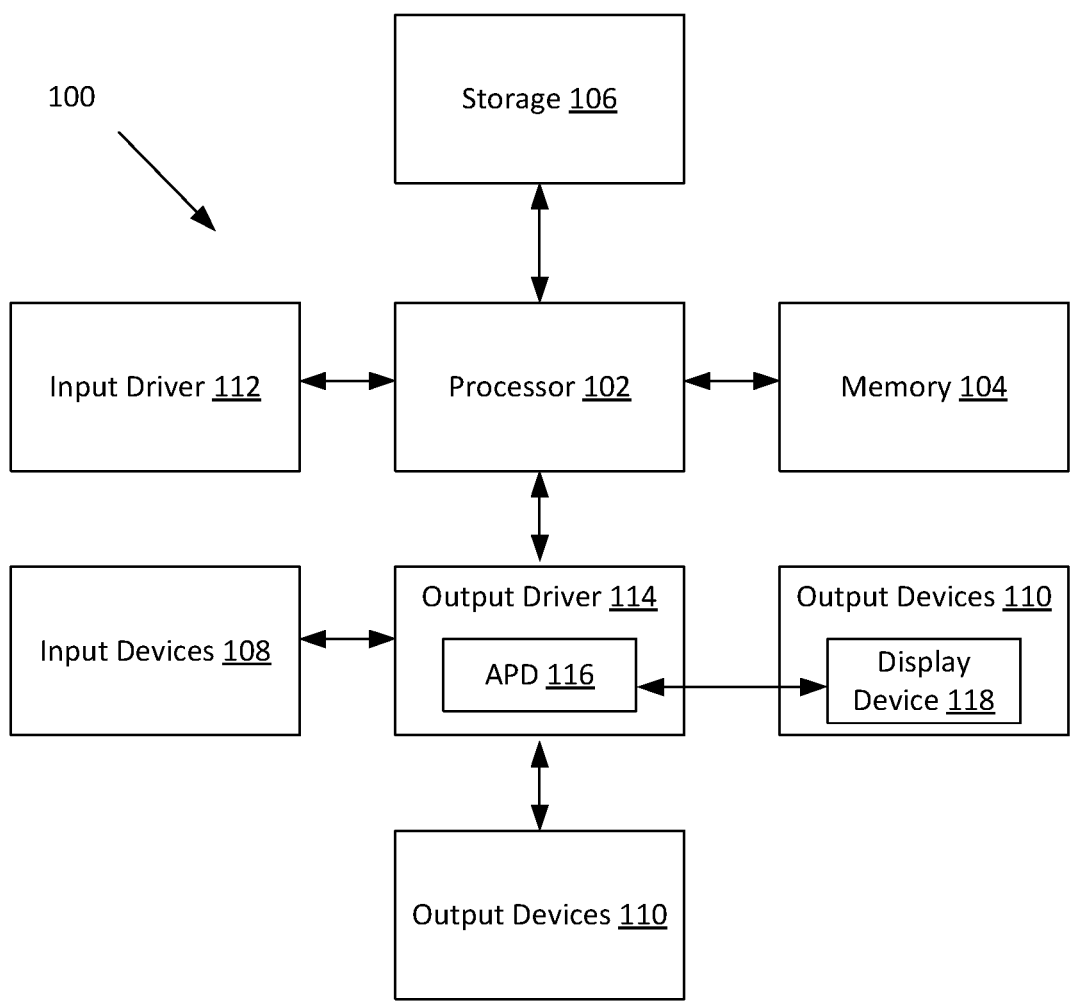
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
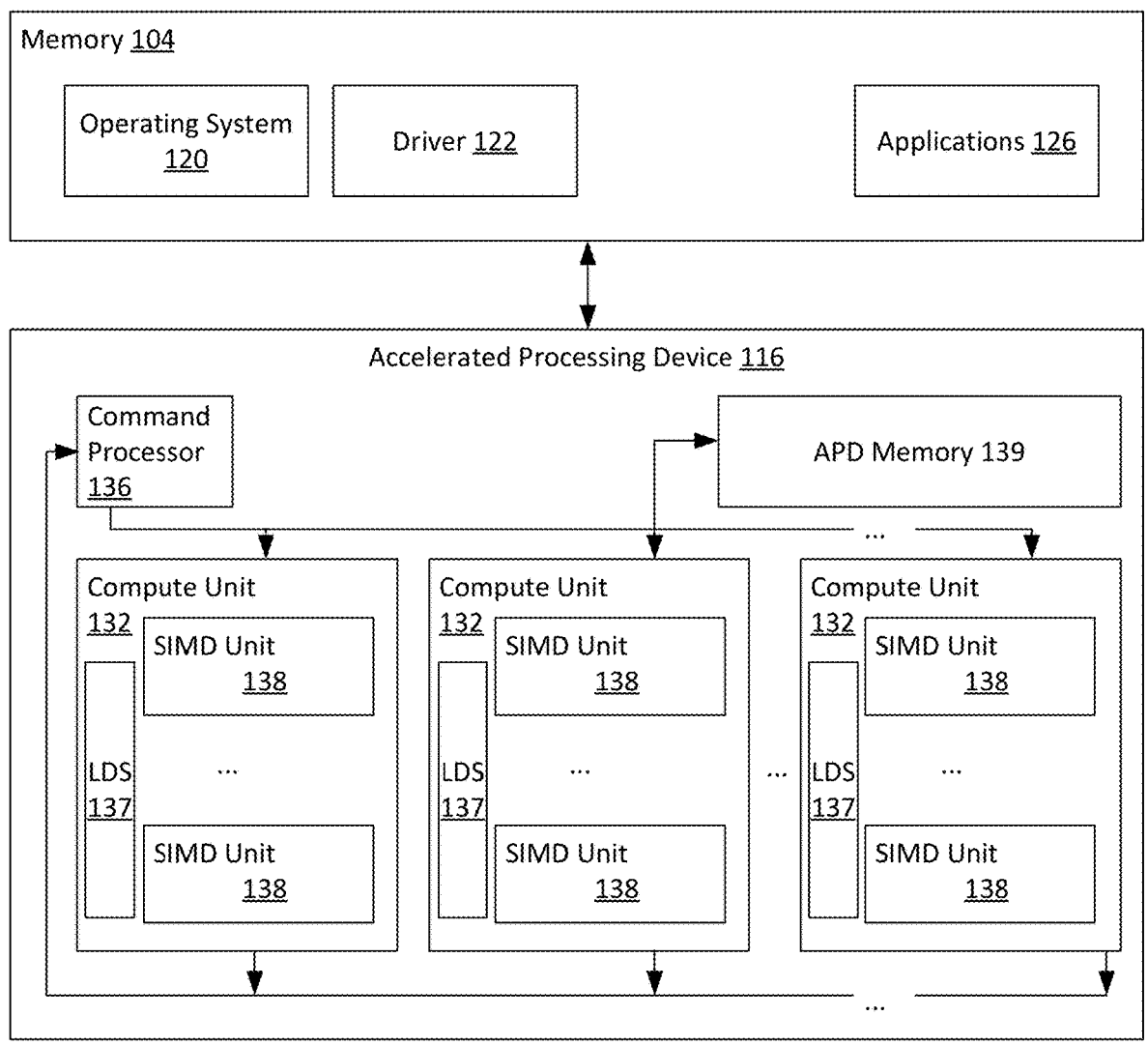
FIG. 2 is a block diagram of the device of FIG. 1, illustrating additional detail, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The compute units 132 are sometimes referred to as "parallel processing units 202" herein. Each compute unit 132 includes a local data share ("LDS") 137 that is accessible to wavefronts executing in the compute unit 132 but not to wavefronts executing in other compute units 132. A global memory 139 stores data that is accessible to wavefronts executing on all compute units 132. In some examples, the local data share 137 has faster access characteristics than the global memory 139 (e.g., lower latency and/or higher bandwidth). Although shown in the APD 116, the global memory 139 can be partially or fully located in other elements, such as in system memory 104 or in another memory not shown or described. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline (e.g., custom operations performed to supplement processing performed for operation of the graphics pipeline). An application 126 or other software executing on the processor 102 transmits programs that define such computation tasks to the APD 116 for execution.

The APD 116 is configured to implement features of the present disclosure by executing a plurality of functions as described in more detail below. For example, the APD 116 is configured to receive images comprising one or more three dimensional (3D) objects, divide images into a plurality of tiles, execute a visibility pass for primitives of an image, divide the image into tiles, execute coarse level tiling for the tiles of the image, divide the tiles into fine tiles and execute fine level tiling of the image. Optionally, the front end geometry processing of a primitive determined to be in a first one of the tiles can be executed concurrently with the visibility pass.

Figure 3:
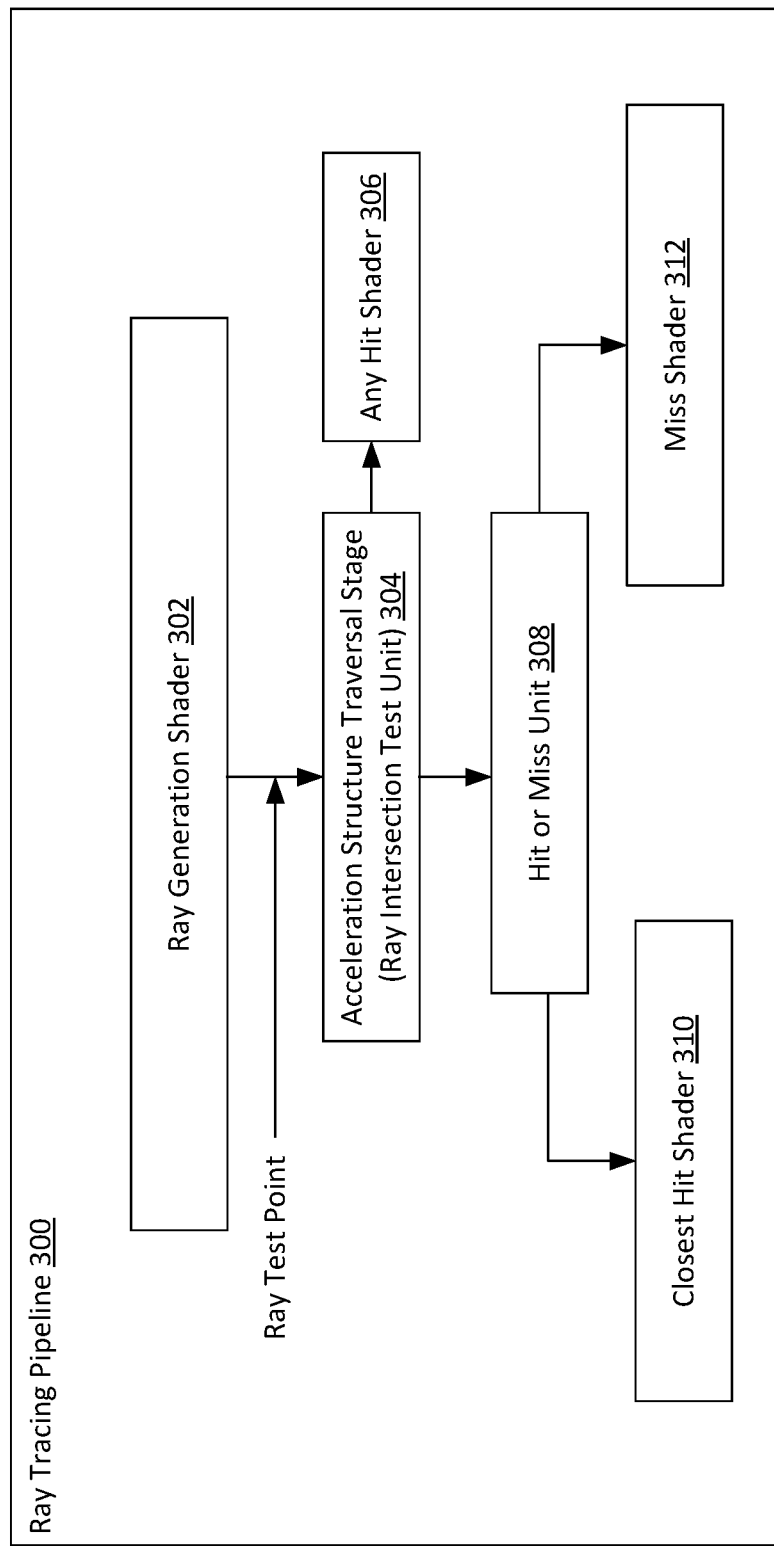
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing. While it is possible to obtain multiple samples per pixel by casting multiple rays per pixel, techniques are provided herein for obtaining multiple samples per ray so that multiple samples are obtained per pixel by casting only one ray. It is possible to perform such a task multiple times to obtain additional samples per pixel. More specifically, it is possible to cast multiple rays per pixel and to obtain multiple samples per ray such that the total number of samples obtained per pixel is the number of samples per ray multiplied by the number of rays per pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed. It should be understood that where a first node points to a second node, the first node is considered to be the parent of the second node.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
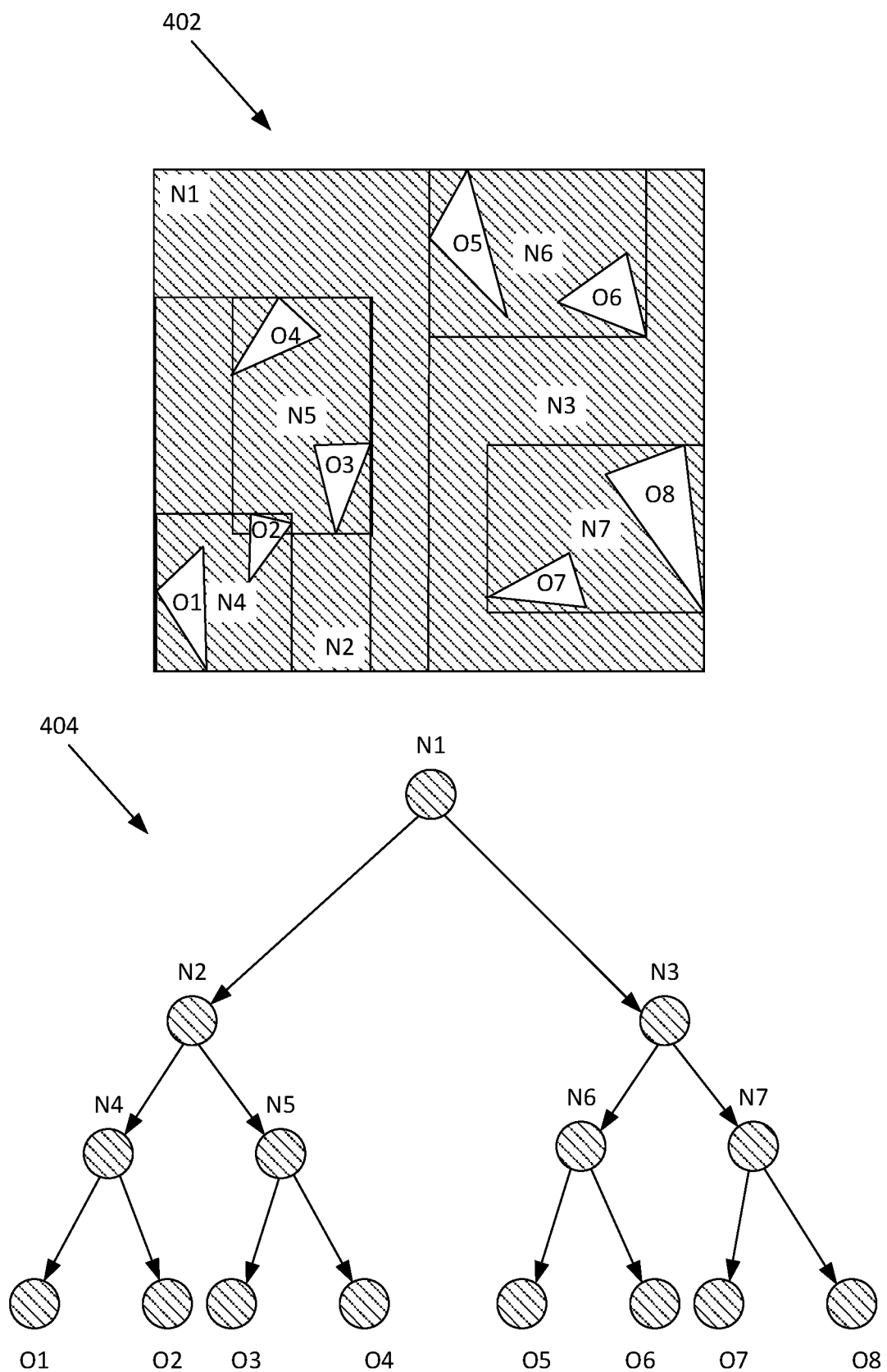
FIG. 4 is an illustration of a bounding volume hierarchy ("BVH"), according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

Figure 5:
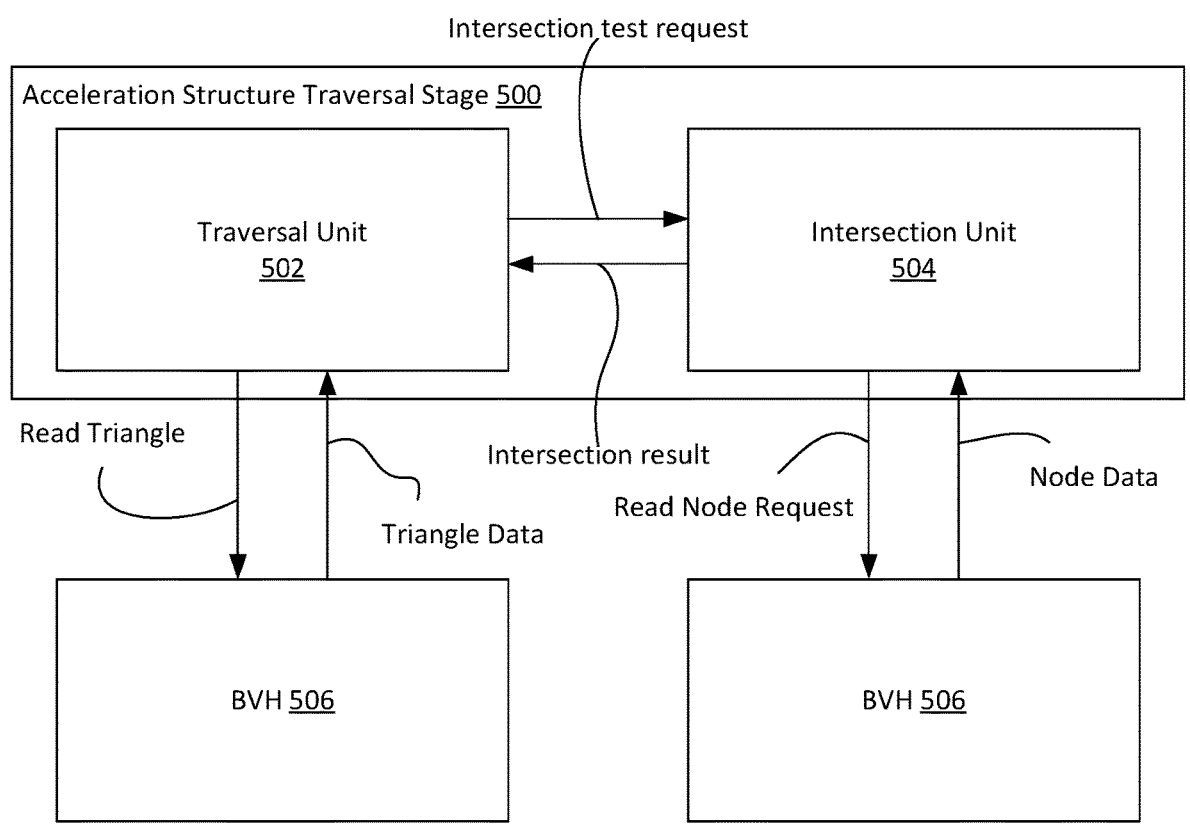
FIG. 5 is a block diagram of an acceleration structure traversal stage, according to an example.

FIG. 5 is a block diagram of an acceleration structure traversal stage 500, according to an example. In some implementations, the acceleration structure traversal stage 304 of FIG. 3 is the acceleration structure traversal stage 500 of FIG. 5.

The acceleration structure traversal stage 500 includes a traversal unit 502 and an intersection unit 504. The traversal unit 502 accepts a request to test a ray for intersection with geometry in a scene. The traversal unit 502 traverses the nodes of the acceleration structure 506, requesting and obtaining node data from the acceleration structure 506, and requests intersection tests be performed by the intersection unit 504. The intersection unit 504 performs the requested intersection tests for the traversal unit 502 and returns the results of the intersection tests to the traversal unit 502. Although a particular hardware configuration is shown (traversal unit 502 and intersection unit 504), the operations described as being performed by these units can be performed by any hardware, software, or combination of hardware and software.

In an example, the traversal unit 502 receives a ray to test for intersection with the geometry of the scene represented by the acceleration structure 506. The traversal unit 502 reads a first non-leaf node (in an example, N2 from bounding volume hierarchy 404 of FIG. 4) from the acceleration structure 506 and requests that the intersection unit 504 test the ray against the geometry of that node. The intersection unit 504 performs that test and returns the test result to the traversal unit. The result indicates that the ray does not intersect the box and therefore eliminates children of the non-leaf node from consideration. Subsequently, the traversal unit 502 reads another non-leaf node (in an example, N3) from the acceleration structure 506 and requests that the intersection unit 504 test the ray against the geometry of that node. The intersection unit 504 performs that test and returns the test result to the traversal unit 502. The test result indicates that the ray intersects the box associated with that node and therefore the traversal unit 502 continues with testing the children of that non-leaf node (in the example, nodes N6 and N7).

In various implementations, the traversal unit 502 and intersection unit 504 are implemented as software executing on a programmable processor, hard-wired circuitry, or a combination thereof. In one example implementation, the traversal unit 502 is a shader program (a "traversal shader program") executing on one or more compute units 132. The intersection unit 504 is dedicated hardware circuitry configured to perform intersection tests, such as ray-triangle and ray-box intersection tests. The traversal shader program executes instructions of an instruction set architecture which includes at least one instruction to request that the intersection unit 504 perform an intersection test for the ray. In some implementations, for procedural geometry, the traversal shader program triggers execution of a set of instructions for testing the ray against procedural geometry. In other implementations, the traversal unit 502 is a hard-wired circuitry unit that performs the operations described herein.

As described above, in some examples, the traversal unit 502 uses a traversal shader program to traverse the bounding volume hierarchy to determine intersection information for a ray. These traversal shader programs execute in a SIMD manner in the compute units 132. Each work-item executes for a single ray. As described above, the work-items execute in parallel, such that multiple work-items are traversing a bounding volume hierarchy for multiple rays in parallel.

Executing a traversal shader program involves performing a series of iterations. In each iteration, the traversal shader program identifies at least one node of the BVH to test a ray against and requests the intersection unit 504 test the ray against that node. If the identified node is a box node and the ray is determined to intersect that node, then the traversal shader program identifies the children of that box as nodes for testing in subsequent iterations, and requests the ray be tested against those children in the subsequent iterations. For a leaf node, if a hit is detected, the intersection unit 504 triggers execution of an appropriate shader program as described with respect to FIG. 3.

Figure 6A:
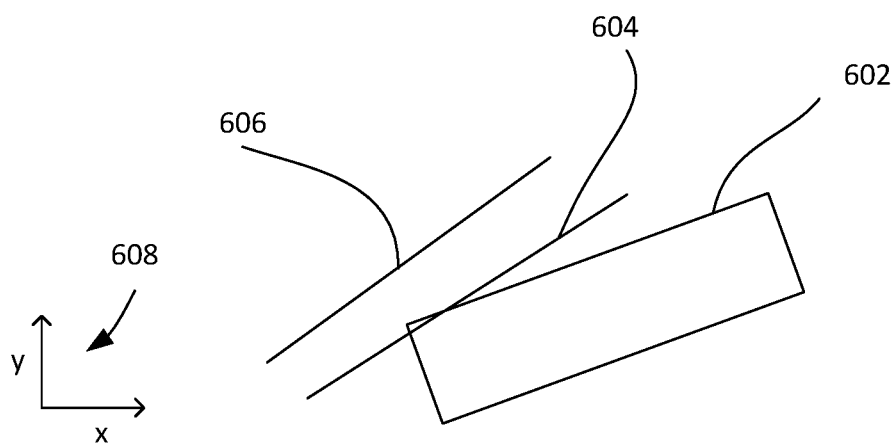
FIG. 6A illustrates an oriented bounding box, according to an example.

It is possible for any non-leaf node N (FIG. 4) of a BVH to be an oriented bounding box. An oriented bounding box is a bounding box whose extents are not parallel with the axes (e.g., x, y, and z of the coordinate space in which the bounding box sits). By contrast, a non-oriented bounding box is a bounding box whose extents are parallel with the axes. FIG. 6A illustrates an oriented bounding box 602, according to an example. A first ray 604 is illustrated which intersects the bounding box 602 and a second ray 606 is illustrated which does not intersect the bounding box 602. As can be seen, the sides of the bounding box 602 are not parallel to the axes 608. In this document, although two spatial dimensions are sometimes shown, it should be understood that this is done for clarity and that the teachings apply similarly to geometry in three dimensions.

The test for intersection of a ray with a bounding box is significantly simpler if the test is performed for an axis-aligned bounding box (a bounding box whose extents are parallel to the axes) than if performed with a non-axis-aligned bounding box (a bounding box whose extents are not parallel to the axes). To accommodate this, oriented bounding boxes are typically stored as a non-oriented bounding box and a rotation. The intersection unit 504 tests a ray for intersection with an oriented bounding box by applying the rotation to the ray (rather than to the box), which produces the same result as if the rotation were applied to the bounding box, and allows the intersection determination to be performed against an axis-aligned bounding box.

Figure 6B:
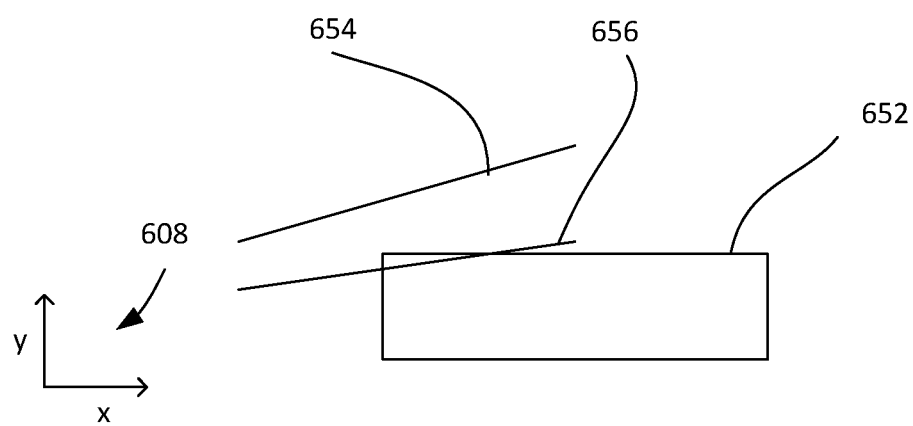
FIG. 6B illustrates testing rays for intersection with an axis-aligned bounding box, according to an example.

FIG. 6B illustrates testing rays for intersection with an axis-aligned bounding box 652, according to an example. Two rays are shown in FIG. 6B—ray 654 and ray 656. Ray 654 is the rotated version of ray 606 and ray 656 is the rotated version of ray 604. Instead of rotating the bounding box 602 as in FIG. 6A, the box 652 is stored as an axis-aligned bounding box and the rays are rotated, which allows the intersection test for intersection of the rays with the bounding box 652 to be performed in a simpler manner than if the box were not axis-aligned.

If the rotation calculation for the rays (that is, the calculation to rotate the rays such that an intersection test provides the results for whether the rays intersect an oriented bounding box) were performed to infinite precision, then the result for the intersection test for the rays in FIG. 6B would always be the same as for the rays in FIG. 6A. However, in practice, rotation calculations are performed with floating point calculations, which introduces some error (e.g., due to rounding). This error can result in a failure to render in a watertight manner, which can result in gaps between primitives where no gaps should occur. In an example, a test for intersection between a ray and an oriented box node results in a miss, meaning that the primitive descendants are never tested for intersection. However, the "true" ray, calculated with infinite precision, actually struck the primitive and should have resulted in a rendered pixel. Thus, in this example, the renderer has inadvertently rendered a gap between primitives.

To avoid the issues described above, the acceleration structure traversal stage 500 tracks an error bound for the calculation that rotates the ray by the rotation amount specified by the oriented bounding box. When performing the test for intersection of the rotated ray with the oriented bounding box, the acceleration structure traversal stage 500 performs this test as if the bounding box were larger than specified in the BVH by an amount that is sufficient to compensate for the error bound mentioned above. Stated differently, the acceleration structure traversal stage 500 conservatively grows the bounding box by an amount that is sufficient to treat as a hit any ray that would miss the non-grown bounding box by less than the error bound. Put simply, the intersection test treats an intersection test as a hit if there is a possibility that the rotation calculation error would result in a miss where the ray would actually hit the box if the rotation calculation were performed with infinite precision.

Figure 7:
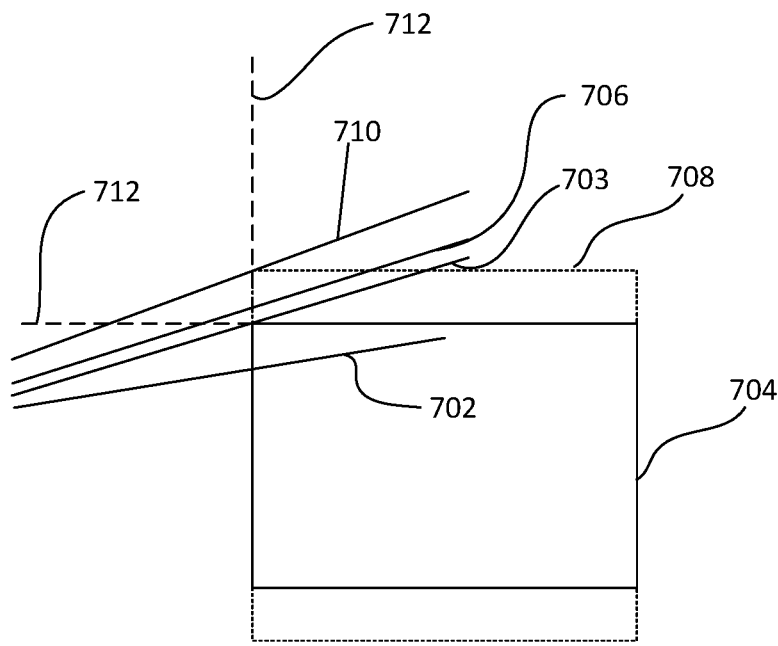
FIG. 7 conceptually illustrates a technique for compensating for the error introduced by floating point ray rotation calculation, according to an example.

FIG. 7 conceptually illustrates a technique for compensating for the error introduced by floating point ray rotation calculation, according to an example. Box 704 is an oriented bounding box for which a rotation is specified. An infinite precision rotated ray 702 is shown. This ray 702 represents the ray under consideration if the rotation for the oriented bounding box 704 were applied with infinite precision. Calculated rotated ray 706 illustrates an example ray with rotation applied, where some precision is lost due to floating point operations. In this example, the calculated rotated ray 706 does not intersect the bounding box 704 but the actual ray 702 does. It can thus be seen that the floating point error can cause incorrect results to occur. Extended box plane extents 712 represent points of intersection with a ray that indicate missing the box 704.

To account for this floating point error, the acceleration structure traversal stage 500 performs the intersection test as if the box were large enough to account for the bounds on this error. Put differently, the acceleration structure traversal stage 500 performs the intersection test as if the box were grown to be large enough such that if the ray missed the not-grown box by an amount related to the bounds on that error, then the ray would hit this larger sized box.

In FIG. 7, the grown box 708 is shown. Note that the grown box includes all of the space of the ungrown box 704, and additional space. The calculated rotated ray does not hit the bounding box 704 but does hit the grown bounding box 708. Ray 710 represents the ray that would be produced if the error in rotation calculation that occurred was equal to the bounds on that error, and shows that this ray 710 hits the corner of the grown box 708.

An example technique for growing oriented bounding boxes to account for floating point error in ray rotation calculation is now provided. First, when the BVH is initially built, if a non-leaf node is an oriented bounding box or is the descendant of an oriented bounding box (and thus some rotation is applied), a BVH builder grows the bounding box by a certain amount. This amount is the maximum absolute error that could be introduced by subtractive cancellation when computing the rotation of the ray. This amount is equal to three times the machine epsilon times the sum of the absolute values of the intermediate products of the rotation transform. The machine epsilon is a value that characterizes error due to rounding in floating point arithmetic. The intermediate products of the rotation transform are the results of scalar multiplications for matrix multiplications used to perform the rotation. More specifically, a rotation is implemented as matrix multiplication of a ray by a matrix. Such matrix multiplication includes calculation of multiple products of scalars, and these products are intermediate products. In some examples, the amount by which the box is grown depends on the distance of the ray origin to the box.

At runtime (i.e., while the acceleration structure traversal stage 500 is traversing a BVH), the acceleration structure traversal stage 500 tracks the maximum absolute error that could be introduced by calculating the rotation for the ray. This maximum absolute error must be less than 16 multiplied by the machine epsilon multiplied by the maximum component. Tracking the error bounds includes tracking and updating the error bounds as the calculations for rotating the ray are performed. In some examples, the calculation for rotating the ray includes a number of intermediate mathematical steps. For any such step, the acceleration structure traversal stage 500 identifies an error bounds for that step and accumulates that error bounds into a running error bounds for the entire rotation calculation. In some examples, determining the error bounds for any particular intermediate mathematical step includes performing that mathematical step in a manner that produces an error bounds as output, rather than the calculated value. In an example, rotation involves performing a matrix multiplication. This matrix multiplication includes performing a dot product, which includes performing multiple multiply and add operations. In some examples, each such multiply and add operation introduces an error amount, and this error amount is calculated by performing the multiply and add in a manner that produces an error bound result. In an example, performing a multiply operation introduces a maximum error amount based on the operands of the multiply operation. The acceleration structure traversal stage 500 tracks this maximum error bound and accumulates that with a running error bound associated with other operations for rotating the ray.

The final accumulated value after performing the ray rotation calculations is used as the error bounds for growing the bounding box as described below and shown in FIG. 7. As described above, in some examples, the error bounds are tracked as an integer exponent rather than a floating point value or some different value.

In some examples, the error that is tracked is an integer exponent rather than as a floating point value or integer value. In some examples, the integer exponent that represents the error bounds is an 8-bit integer exponent. The integer exponent is a value that represents a power-of-two exponent that represents the maximum error that could occur. Using the integer exponent as the value that tracks error bound provides several benefits. For example, calculating the error is simpler than if a normal floating point value were used, since arithmetic is simplified (e.g., integer, rather than floating point values are used, and the operations required are simpler—for example, multiplication of two values is represented as addition of exponents). In addition, use of a relatively small integer exponents (e.g., 8 bits) means that less data is needed for tracking the error bounds. Further, Because the error bound value represents the maximum error, and because intersection tests between the ray and the box maintains watertightness by conservatively growing the box, an imprecise error bound does not prevent watertightness as long as the imprecise error bound is greater than the true maximum error.

The maximum error described above is used to grow the extents of the bounding box. In an example, the acceleration structure traversal stage 500 grows both near and far planes of the bounding box 704 by the error bounds. This growing includes, for each axis, moving the plane closest to the ray origin closer to the ray origin by the error bounds and moving the plane farthest from the ray origin farther from the ray origin by the error bounds. The acceleration structure traversal stage 500 then tests the ray against this grown bounding box as normal. In other words, the acceleration structure traversal stage 500 determines whether the ray, with rotation applied as calculated (including the error intrinsic to floating point calculations), intersects the box grown based on the tracked error bounds.

In some examples, the acceleration structure traversal stage 500 determines whether the rotated ray is within the grown box 708 in the following manner. The acceleration structure traversal stage 500 applies the maximum error to a ray that is at the origin of the rotated ray 706 and that that intersects a corner of the ungrown box 704 (ray 703) to obtain ray 710 representing the maximum extents, and grows the box so that the corner of the box intersects the ray 710 (thus generating grown box 708). If the rotated ray 706 intersects box 708, then the rotated ray 706 is treated as a hit and if the rotated ray 706 does not intersect box 708, then the rotated ray 706 is treated as a miss.

It should be understood that a BVH can include multiple oriented bounding boxes in an ancestor chain. For example, one node can be an oriented bounding box and a child of that node can also be an oriented bounding box, meaning that rotation is applied to that child that is different than the rotation of the parent. In another example, the child does not have an additional rotation applied as compared with the parent, but a child of the child does have an additional rotation applied as compared with the parent. Any number of nodes in a chain of ancestors can have rotation applied. In addition, to test a ray for intersection with an oriented bounding box that has one or more oriented bounding boxes in the ancestor chain, the rotation calculation has to be performed for each such oriented bounding box. Each such calculation introduces additional floating point error, which accumulates. In performing the test for intersection of a ray with a node that has one or more oriented bounding boxes in the ancestor chain (including that node itself), the acceleration structure traversal stage 500 accumulates the error for the rotation for each such oriented bounding box, grows the bounding box being tested by that accumulated error, and performs the intersection test against that grown bounding box.

Figure 8A:
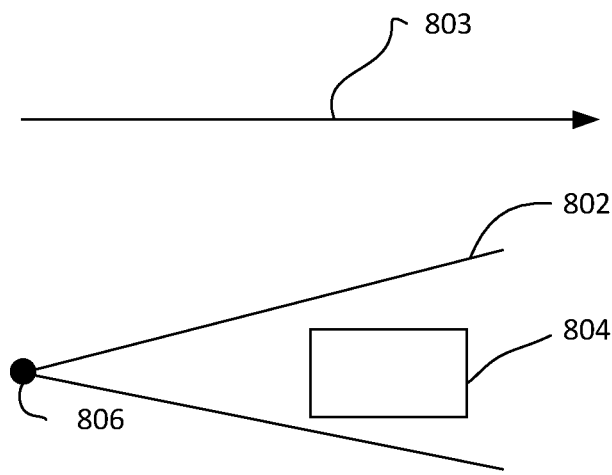
FIGS. 8A and 8B illustrates an alternative technique for compensating for the error, according to an example.
Figure 8B:
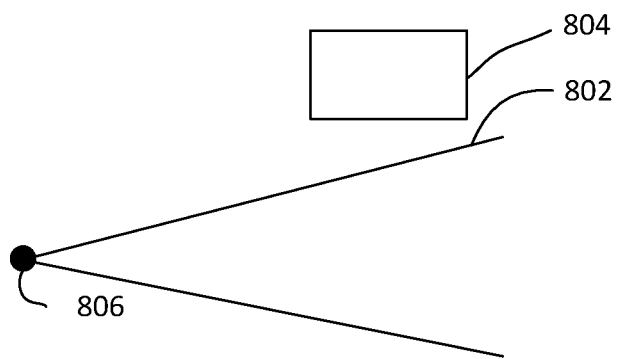

It is possible for the error to grow so large that the ray is considered unreliable. In some implementations, a different technique is used to test a ray against a box where the accumulated error bounds for that box is above a threshold. It should be understood that a box that is either an oriented bounding box itself or that has one or more oriented bounding boxes in its ancestor chain can have an accumulated error bounds above the threshold. FIGS. 8A and 8B illustrates this alternative technique, according to an example. In some examples, for each axis, the error bounds are calculated. The acceleration structure traversal stage 500 uses the test of FIG. 7 for the axis or axes for which the error bounds is not above the threshold and uses the test of FIGS. 8A and 8B for the axis or axes for which the error bounds is above the threshold.

In this alternative technique, the acceleration structure traversal stage 500 does not grow the box by an amount related to error. Instead, the acceleration structure traversal stage 500 performs a test for intersection between an error area 802 and the box 804. The error area 802 represents the accumulated floating point error in the ray, expanded based on distance from the ray origin 806. More specifically, a cone having a center line that is parallel to the axis 803 for which error bounds is above the threshold. At any given distance from the origin 806, the radius of the cone is based on the error amount and that distance. If any portion of the box 804 is within that cone, the acceleration structure traversal stage 500 determines that the ray hits the box for that axis 803, and if no portion of the box 804 falls within the cone, then the acceleration structure traversal stage 500 determines that the ray does not hit the box 804.

Figure 9:
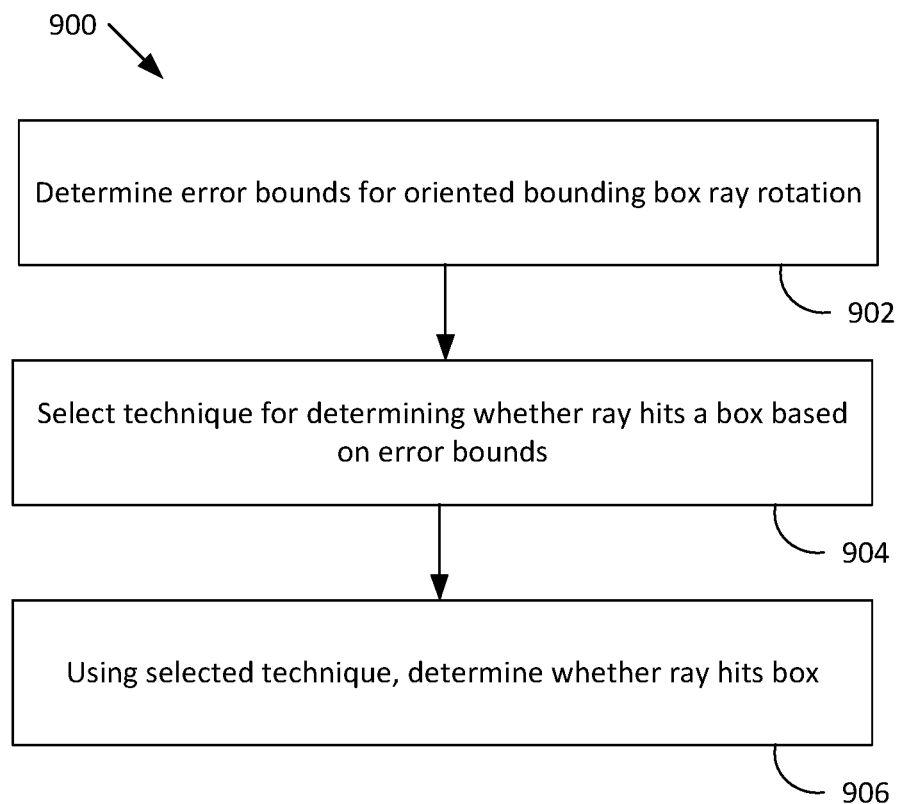
FIG. 9 illustrates a method for detecting intersection of a ray with a box, according to an example.

FIG. 9 illustrates a method 900 for detecting intersection of a ray with a box, according to an example. Although described with respect to the system of FIGS. 1-8B, those of skill in the art will understand that any system, configured to perform the steps of the method 900 in any technically feasible order, falls within the scope of the present disclosure.

At step 902, the acceleration structure traversal stage 500 determines the error bounds for a ray for which rotation for an oriented bounding box has been applied. In various examples, determining these error bounds includes accumulating bounds for the error for the various calculations performed to determine ray rotation for the oriented bounding box. In some examples, error bounds for any particular calculation is caused by floating point error (e.g., rounding error).

At step 904, the acceleration structure traversal stage 500 selects a technique for determining whether the ray hits a box based on the accumulated error bounds. In some examples, selecting the technique is based on the magnitude of the error bounds. More specifically, if the error bounds is less than a threshold, then the technique is the technique of FIG. 7 (box growing) and if the error bounds is greater than a threshold, then the technique is the technique of FIGS. 8A and 8B (cone-based). At step 906, the acceleration structure traversal stage 500 performs the intersection test using the selected technique, both of which are described above.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of performing bounding volume hierarchy ("BVH") traversal for ray tracing operations, the method comprising:
   determining error bounds for a rotation operation for a ray;
   in response to the error bounds being above a threshold, selecting a technique for determining whether the ray intersects a bounding box based on the error bounds, wherein the technique comprises determining whether a cone defined by the error bounds overlaps with the bounding box;
   determining whether the ray hits the bounding box based on the selected technique; and
   continuing BVH traversal based on whether the ray hits the bounding box, to obtain a ray tracing result for the ray.

2. The method of claim 1, wherein determining the error bounds includes accumulating error bounds for sub-operations of the rotation operation for the ray.

3. The method of claim 1, further comprising:
   determining second error bounds for a rotation operation for a second ray; and
   selecting a second technique for determining whether the second ray intersects a second bounding box in response to the second error bounds being less than the threshold.

4. The method of claim 3, wherein the second technique comprises determining whether the second ray intersects a grown bounding box having extents that are grown with extents specified by a bounding volume hierarchy.

5. The method of claim 4, wherein the grown bounding box is grown based on the second error bounds.

6. The method of claim 4, wherein determining whether the second ray hits the bounding box comprises determining whether the second ray hits the grown bounding box.

7. The method of claim 1, wherein the cone has a vertex at an origin of the ray.

8. A system for performing bounding volume hierarchy ("BVH") traversal for ray tracing operations, the system comprising:
   a processor; and
   a memory storing data for the processor,
   wherein the processor is configured to:
      determine error bounds for a rotation operation for a ray;
      in response to the error bounds being above a threshold, select a technique for determining whether the ray intersects a bounding box based on the error bounds, wherein the technique comprises determining whether a cone defined by the error bounds overlaps with the bounding box;
      determine whether the ray hits the bounding box based on the selected technique; and
      continue BVH traversal based on whether the ray hits the bounding box, to obtain a ray tracing result for the ray.

9. The system of claim 8, wherein determining the error bounds includes accumulating error bounds for sub-operations of the rotation operation for the ray.

10. The system of claim 8, wherein the processor is further configured to:
    determine second error bounds for a rotation operation for a second ray; and
    select a second technique for determining whether the second ray intersects a second bounding box in response to the second error bounds being less than the threshold.

11. The system of claim 10, wherein the second technique comprises determining whether the second ray intersects a grown bounding box having extents that are grown with extents specified by a bounding volume hierarchy.

12. The system of claim 11, wherein the grown bounding box is grown based on the second error bounds.

13. The system of claim 11, wherein determining whether the second ray hits the bounding box comprises determining whether the second ray hits the grown bounding box.

14. The system of claim 8, wherein the cone has a vertex at an origin of the ray.

15. A non-transitory computer-readable medium storing instructions that, when executed by a processor, cause the processor to perform operations for bounding volume hierarchy ("BVH") traversal for ray tracing operations, the operations comprising:
    determining error bounds for a rotation operation for a ray;
    in response to the error bounds being above a threshold, selecting a technique for determining whether the ray intersects a bounding box based on the error bounds, wherein the technique comprises determining whether a cone defined by the error bounds overlaps with the bounding box;
    determining whether the ray hits the bounding box based on the selected technique; and
    continue BVH traversal based on whether the ray hits the bounding box, to obtain a ray tracing result for the ray.

16. The non-transitory computer-readable medium of claim 15, wherein determining the error bounds includes accumulating error bounds for sub-operations of the rotation operation for the ray.

17. The non-transitory computer-readable medium of claim 15, wherein the operations further comprise:
   determining second error bounds for a rotation operation for a second ray; and
   selecting a second technique for determining whether the second ray intersects a second bounding box in response to the second error bounds being less than the threshold.

18. The non-transitory computer-readable medium of claim 17, wherein the second technique comprises determining whether the second ray intersects a grown bounding box having extents that are grown with extents specified by a bounding volume hierarchy.

19. The non-transitory computer-readable medium of claim 18, wherein the grown bounding box is grown based on the second error bounds.

20. The non-transitory computer-readable medium of claim 18, wherein determining whether the second ray hits the bounding box comprises determining whether the second ray hits the grown bounding box.

* * * * *